April 3, 1951   J. M. HOURIGAN   2,547,705
COMPARATOR FOR REGULATING TIMEPIECE BALANCE WHEELS
Filed March 13, 1948
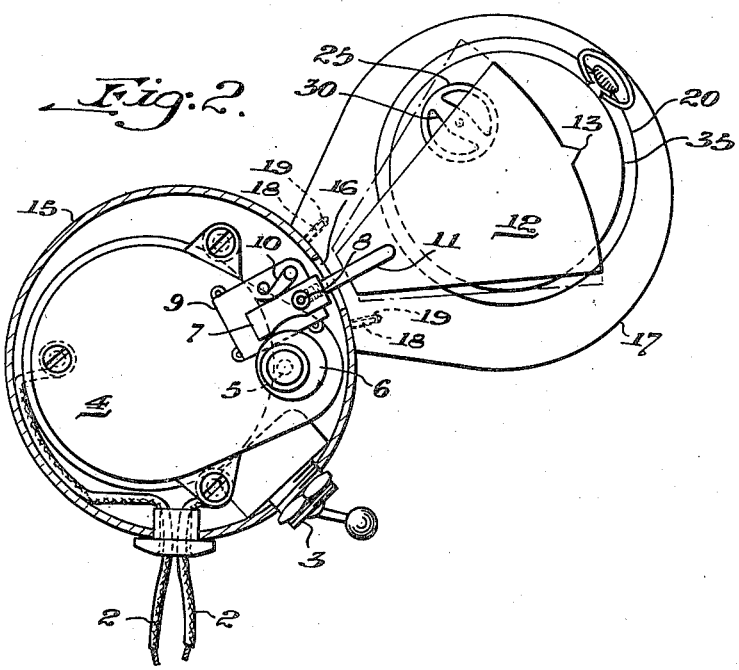
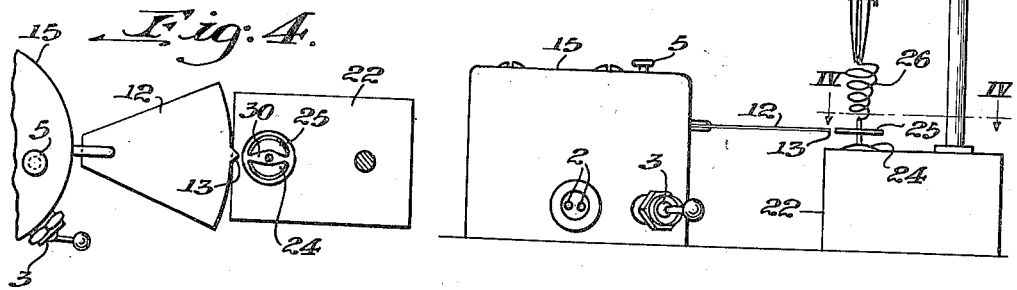
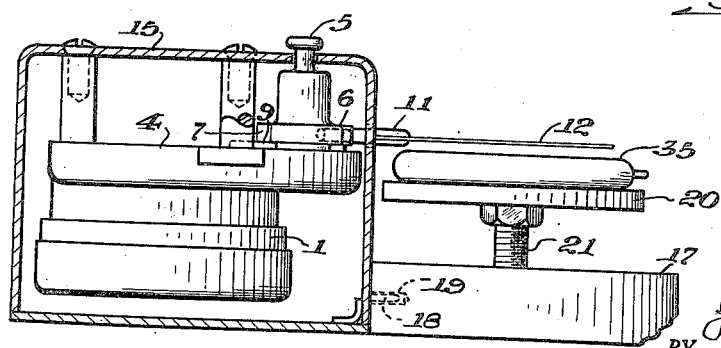
INVENTOR.
Joseph M. Hourigan
BY Brown, Critchlow, Flick & Peckham
his ATTORNEYS.

Patented Apr. 3, 1951

2,547,705

UNITED STATES PATENT OFFICE 2,547,705

COMPARATOR FOR REGULATING TIMEPIECE BALANCE WHEELS

Joseph M. Hourigan, New Kensington, Pa.

Application March 13, 1948, Serial No. 14,754

4 Claims. (Cl. 73—6)

This invention relates to a comparator for visually calibrating the oscillating system of a timepiece and, more particularly, to a device for use in adjusting the rate of oscillation of the balance wheel either before or after its assembly in the timepiece.

The usual timepiece, such as a watch, contains a balance wheel and hairspring, which together form the oscillating system that is driven by a pallet and fork from an escape wheel. The rate of oscillation of the balance wheel varies with the effective length of the hairspring. That length must be determined with considerable exactness before the balance wheel and the hairspring are assembled in the watch, because once they have been assembled, further adjustment of the effective length is limited to a very narrow range. One method that is commonly used in making this determination is to impart a free oscillating movement to the balance wheel while it is supported by the hairspring, and to count the number of oscillations in a given interval of time. The effective length of the hairspring is then changed by trial and error until the balance wheel has, for example, 75 oscillations in 30 seconds, which is equivalent to a period of two-fifths of a second and is its correct rate of oscillation in most watches. Since it is usually necessary to make numerous adjustments in the length of the hairspring to obtain this frequency even approximately, and since it is difficult to count the oscillations of the balance wheel accurately, this method is both time consuming and likely to produce error in the watch. When the balance wheel and hairspring have been assembled in the watch, it is customary to make further adjustments in the rate of oscillation of the balance wheel, within the limited range allowable by the adjusting mechanism, after comparing the watch over a long period of time with a standard chronometer. This is again a time consuming operation, although the time can be shortened by using certain expensive electrical instruments.

It is among the objects of this invention to provide apparatus that will permit rapid adjustment of the rate of oscillation of the balance wheel of a timepiece, either before or after its assembly in the timepiece.

Another object is to provide apparatus for rapidly measuring the amount of error in a timepiece having an oscillating balance wheel.

A further object is to provide such apparatus that is inexpensive to make and simple to operate and that is small and light in weight.

The comparator apparatus constructed in accordance with this invention includes a timing member that is adapted to be moved to and fro at a constant frequency exactly equal to the desired frequency of the balance wheel of the timepiece that is to be adjusted. The timing member is preferably moved by a cam rotated by a synchronous electric motor. In using the apparatus, the timing member is caused to move to and fro in a plane substantially parallel to the plane of the balance wheel and in close proximity to a selected point of reference thereon, such as the radius bar, either before or after the balance wheel and its associated hairspring have been assembled in the timepiece. The rate of oscillation of the balance wheel is then visually compared with the rate of the timing member. If the point of reference on the balance wheel, when brought into phase with the timing member, remains in phase, then the balance wheel has the correct frequency, or period. If, however, as will usually be the case, the two frequencies are not the same, there will be a promptly visible shift in their phase relationship; and the error in the frequency of the balance wheel may be measured by the time required for the timing member and the point of reference to come again momentarily into phase. Whether measured or not, the error may be corrected by changing the effective length of the hairspring.

The preferred embodiment of the invention is shown in the accompanying drawings, in which Fig. 1 is an elevation of the comparator apparatus, with the outer casing in section, showing the method of using the apparatus to adjust a balance wheel already positioned in a watch, Fig. 2 is a plan view of the same, the outer casing again being in section, Fig. 3 is an elevation of the comparator apparatus, at a slightly reduced scale, as used to adjust a balance wheel and its associated hairspring before their assembly in a watch, and Fig. 4 is a fragmentary section along the line IV—IV in Fig. 3.

Referring to Figs. 1 and 2 of the drawings, a synchronous motor 1 is connected by electrical conductors 2 and a manually operated switch 3 to a source of alternating current having a constant frequency. The ordinary 110 volt, 60 cycle, A. C. circuit is a satisfactory current source, since its frequency is constant within practicable limits. A conventional gear train (not shown in the drawings), located in a gear housing 4 on top of the motor, connects the rotor of the synchronous motor to a vertical shaft 5 projecting above the housing a considerable distance. Rigidly mounted on this shaft is a cam 6, which is rotated through the gear train at an R. P. M. equal to the desired frequency of the balance wheel that is to be adjusted. As previously stated, the balance wheel in most watches is intended to have a period of two-fifths of a second, or 150 beats a minute; and for adjusting such balance wheels, the cam 6 will be rotated at exactly 150 R. P. M. Adjacent to the cam, a lever 7 is pivotally secured by a pivot pin 8 to the top of the gear housing or, as in the embodiment shown, to a plate 9 attached thereto. The inner end of the lever is constantly urged by a spring 10 against the periphery of the cam and oscillates to and fro in a horizontal plane at a frequency equal to the R. P. M. of the cam, or 150 oscillations a minute in the example given. The lever is provided with an extension arm 11 screwed into its outer end, and the outer end of the arm has a slot for frictionally holding a timing member 12. Both the lever extension arm and the timing member may be readily detached from the lever for greater convenience in packing and shipping the apparatus.

The timing member 12, which moves to and fro with the same frequency as the lever 7, may be made of any thin material and is preferably shaped to form a segment of a circle with a narrow, pointed projection 13 at the outer end of its longitudinal axis. The relative length of each end of the lever, the length of the extension arm, the size of the timing member, and the eccentricity of the cam are preferably so proportioned as to give the timing member a range of amplitude at various radial distances from its center of oscillation roughly corresponding to the range in the radii of the balance wheels most commonly found in watches. Such proportioning permits the timing member alternately to cover and uncover to the view of an observer, as described below, one half of variously sized balance wheels to be calibrated. I have found it desirable to color the upper surface of the timing member with a color, such as orange, that is both restful to the eye and contrasting to the usual silvery color of a balance wheel. It may also be desirable to have the upper surface of the pointed projection 13 of a different color from the rest of the timing member, when this projection is to be used as a point of reference.

A casing 15 encloses the synchronous motor, gear housing, cam, and lever assembly. The casing is provided with openings, through which project the electrical conductors 2, the handle of the switch 3, and the upper end of the cam shaft 5. The side of the casing is also provided with a horizontal slot 16 to permit the lever extension arm 11 to project through the casing and to swing freely. In adjusting a balance wheel already positioned in a watch, it may be convenient to provide a watch support 17 that is detachably secured to the side of the casing in any suitable manner, as by friction plugs 18 and sockets 19. The support is preferably provided with a vertically adjustable stage 20, which may be raised or lowered by rotating the supporting screw 21, to permit watches of different thickness to be supported just below the timing member 12. In adjusting a balance wheel and its associated hairspring before their assembly in a watch, the watch support 17 is detached from the casing, and the balance wheel is supported by the hairspring in a conventional test stand 22, as shown in Figs. 3 and 4. The hairspring is held by a clamp 23, while the pivot of the balance wheel rests on a smooth bearing surface, such as a crystal 24.

In using the comparator to adjust the length of a hairspring before the hairspring and balance wheel are assembled in a watch, the procedure is as follows (see Figs. 3 and 4). A balance wheel 25 is supported by a hairspring 26 on the test stand 22, the hairspring being held in the clamp 23 at a point that is estimated will give the desired frequency to the balance wheel when it is oscillated. The stand is moved near the comparator so that the end of the radius bar 30 of the balance wheel is close to and opposite the pointed projection 13 at the end of the timing member 12 when the balance wheel is at rest and the timing member is at the midpoint of its swing. In some cases, it may be desirable to use a shorter timing member in order to decrease the amplitude of oscillation of the pointed projection 13. The balance wheel is then turned 90°, more or less, and allowed to oscillate freely. The pointed projection 13 on the timing member is brought into phase with the radius bar of the balance wheel by manually braking the cam shaft 5, which projects through the top of the casing 15. When the two have been brought momentarily into phase, each will appear to pass the midpoint of their swing at the same time. If their periods are equal, they will remain in phase; if not, their phase relationship will shift, and the amount of error in the period of the balance wheel may be measured by the time required for the two to come again momentarily into phase. The greater this interval of time, the less will be the error. In the event that the error is found to be greater than can be compensated for by the regulating mechanism of the watch, the effective length of the hairspring is either increased or decreased by moving the hairspring in the clamp 23 until the error is reduced within compensable limits. This clamping point on the hairspring is marked, and the hairspring and balance wheel are assembled in the watch in the ordinary manner.

In adjusting a balance wheel already positioned in a watch (see Figs. 1 and 2), the watch support 17 is attached to the casing 15, and a watch 35 with its back cover removed to expose the balance wheel 25 is placed face downward on the stage 20. The height of the stage is adjusted until the watch is just below, but not touching, the timing member 12. The watch is then moved about on the stage until approximately one-half of the balance wheel is alternately covered and uncovered to the view of an observer as the timing member swings back and forth and until the radius bar 30, when it has reached the point of its reversal of direction (that is, where its velocity is zero), is approximately at right angles to the edge of the timing member when uncovered to view. The timing member and the balance wheel are then brought into phase, as previously described, so that the radius bar of the balance wheel will be exposed to view when it is in its momentary position of rest. If their rates of oscillation are the same, the radius bar will appear to remain stationary. There is then no error in the timepiece. If, on the other hand, the rates of oscillation of the timing member and the balance wheel are different, there will be a promptly visible shift in their phase relation; and the radius bar, instead of appearing to remain stationary, will disappear from view, to reappear briefly when the two come again momentarily into phase after a measurable interval. The shorter this interval, the greater is the error in the timepiece. The timepiece is fast if this interval is shortened by decreasing the rate of oscillation of the timing member, as by manually braking the cam shaft 5; and the actual error can be readily calculated from the length of the interval. In most cases, however, it will not be necessary to calculate the existing error, but merely to determine whether the timepiece is slow or fast and to adjust the regulating mechanism accordingly. The balance wheel is observed with the aid of the comparator after each adjustment until the balance wheel and timing member are either perfectly synchronized or the error is less than the desired or practicable limit.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A comparator for use in regulating a watch by reference to the oscillating balance wheel positioned therein, comprising a synchronous electric motor having a constant speed, a cam shaft rotated by the motor so as to make one revolution in an interval of time equal to the desired period of the balance wheel, a cam rigidly mounted on the shaft below its upper end, a lever mounted adjacent to the cam, a spring urging the inner end of the lever into constant engagement with the periphery of the cam, a casing enclosing the motor and cam and provided with an opening in its side through which extends the outer end of the lever and provided with an opening in its top through which extends the upper end of the cam shaft, a watch support detachably secured to the side of the casing below the outer end of the lever for supporting a watch with the balance wheel therein exposed to view, and a timing member detachably mounted on the outer end of the lever above the balance wheel and oscillated by the lever in a horizontal plane above the balance wheel at the desired frequency of the balance wheel so as to expose momentarily to view a selected point of reference on the balance wheel when that point is reversing its direction of motion to determine whether the timing member and the balance wheel are oscillating at the same frequency.

2. A comparator for determining the correct effective length of the hairspring attached to a balance wheel oscillating outside of a timepiece, comprising a synchronous electric motor having a constant speed, a cam shaft rotated by the motor so as to make one revolution in an interval of time equal to the desired period of the balance wheel, a cam rigidly mounted on the shaft below its upper end, a lever mounted adjacent to the cam, a spring urging the inner end of the lever into constant engagement with the periphery of the cam, a casing enclosing the motor and cam and provided with an opening in its side through which extends the outer end of the lever and provided with an opening in its top through which extends the upper end of the cam shaft, and a timing member detachably mounted on the outer end of the lever and oscillated thereby in a horizontal plane at a frequency equal to the desired frequency of the balance wheel, whereby the respective frequencies of the timing member and the balance wheel can be compared when the balance wheel is oscillated in a horizontal plane and in close proximity to the timing member.

3. A comparator for use in regulating a watch by reference to the oscillating balance wheel positioned therein, comprising a synchronous electric motor having a constant speed, a cam shaft rotated by the motor so as to make one revolution in an interval of time equal to the desired period of the balance wheel, a cam rigidly mounted on the shaft below its upper end, a lever mounted adjacent to the cam, a spring urging the inner end of the lever into constant engagement with the periphery of the cam, and a timing member detachably mounted on the outer end of the lever above the balance wheel and oscillated by the lever in a horizontal plane above the balance wheel at the desired frequency of the balance wheel so as to expose momentarily to view a selected point of reference on the balance wheel when that point is reversing its direction of motion to determine whether the timing member and the balance wheel are oscillating at the same frequency.

4. A comparator for use in regulating a watch by reference to the oscillating balance wheel positioned therein, comprising a synchronous electric motor having a constant speed, a cam shaft rotated by the motor so as to make one revolution in an interval of time equal to the desired period of the balance wheel, a cam rigidly mounted on the shaft below its upper end, a lever mounted adjacent to the cam, a spring urging the inner end of the lever into constant engagement with the periphery of the cam, and a flat imperforate timing member having an effective width at least equal to the width of the exposed portion of the balance wheel, the timing member being mounted on the outer end of the lever above the balance wheel and in a plane parallel to it and being oscillated by the lever with an amplitude sufficient to alternately open and close a line of sight to a selected point of reference on the exposed portion of the balance wheel, the timing member and the balance wheel being so positioned relative to each other that said line of sight may be opened past a lateral edge of the timing member at the moment when the point of reference on the balance wheel is reversing its direction of motion.

JOSEPH M. HOURIGAN.

REFERENCES CITED

The following references are of record in the file of this patent:

UNITED STATES PATENTS

| Number | Name | Date |
|---|---|---|
| 1,007,171 | Alford | Oct. 31, 1911 |
| 1,771,210 | Fernly | July 22, 1930 |
| 2,024,799 | Luckey | Dec. 17, 1935 |
| 2,444,178 | Weinberger | June 29, 1948 |